UNITED STATES PATENT OFFICE.

NOAK VICTOR HYBINETTE, OF CHRISTIANSAND, NORWAY.

PROCESS OF EXTRACTING COPPER FROM A SULFATE SOLUTION.

1,140,682.  Specification of Letters Patent. Patented May 25, 1915.

No Drawing.  Application filed March 6, 1912.  Serial No. 682,077.

*To all whom it may concern:*

Be it known that I, NOAK VICTOR HYBINETTE, a citizen of the United States of America, residing at Christiansand, S., Norway, have invented certain new and useful Improvements in Processes of Extracting Copper from a Sulfate Solution; and I do hereby declare the following to be a full, clear, and exact description of the invention, such as will enable others skilled in the art to which it appertains to make and use the same.

The present invention relates to a process of extracting copper from a sulfate solution which is obtained by leaching an initial material previously roasted. In processes of this kind said roasting has hitherto been effected only for the purpose of removing especially sulfur, so as to obtain a leaching material containing copper in the form of oxid which is dissolved by the sulfuric acid contained in the electrolyte. Generally the method of working is so that the ore is divided or ground respectively into a fine powder and then heated in a roasting furnace until no more sulfur is oxidized. Thereby sulfurous acid is evolved and copper oxid formed. The roasting, however, on account of the partially occurring sintering is never quite complete for which reason undesired impurities such as iron together with copper will be dissolved at the leaching which takes place afterward considerable quantities of copper on the other hand remaining undissolved. These drawbacks are obviated according to the present invention by mixing the material to be roasted with sulfate of sodium. Thereby a much more complete roasting is attained, the copper contained in the roasting product being for the greatest part present as sulfate of copper although all the iron salt has been decomposed. This process is particularly advantageous if other valuable metals are to be extracted from the ore together with the copper. Not only copper but zinc and nickel as well form with the sulfate of sodium double salts which decomposes only at temperatures considerably higher than those prevailing in the roasting furnace.

The addition of sodium sulfate would be expensive were it not that it can be used over and over again as is the case according to the present invention. It is therefore only necessary to compensate the small mechanical losses occurring by addition of new quantities of sodium salt.

An addition of sodium sulfate to the sulfidic copper ores to be roasted has already previously been proposed by applicant in a known process of concentration according to which the ore is to be subjected first to an oxidizing and thereafter to a reducing roasting process in order to obtain the metal-containing particles of the ore in a state to be readily deposited so that they may be readily separated from the gangue by known processes of concentration and thereby become fit for use in a subsequent smelting process. The object of the present invention, however, is not to obtain a mechanical concentration of the roasting material, but to make the ore suitable for treatment in wet way with electrolytic separation of the copper, and by experiments it has been ascertained that in the case of iron-containing materials that have been roasted with sulfate of sodium, much less iron is dissolved with the copper, which is of great importance for the subsequent electrolytic separation of the copper.

The roasting as ordinarily carried out results in the formation of some kernels, which mainly consist of copper sulfids and in the following leaching with ferric salts it is impossible to dissolve all of these hard kernels. Applicant has found that if a small quantity of some alkali salt is added to the ore before roasting that this materially helps to prevent the formation of such hard insoluble kernels. An addition of 2 to 5% seems to be all that is necessary. It seems that it is immaterial what salt is added as most salt will be converted into sulfate by the reactions taking place in the furnace. Said sulfate is united with copper sulfate to form an easily fusible compound, which is capable of dissolving sulfids and which therefore enters into the body of the sulfid kernels thereby making them spongy when the leaching solution is allowed to act upon them. It is evident therefore that the alkali salt can be regenerated and used again.

The process may for instance be carried out in the following way: The ore is first roasted together with 2 to 5% sulfate of sodium according to the contents of copper of the initial material, after which the roasting product is leached with dilute sulfuric acid. Thereby the sulfate of sodium introduced during the roasting process is dissolved together with the sulfates of copper, zinc, nickel, iron, etc., formed during the roasting process or during the sulfuric-acid-treatment. The solution thus obtained is thereupon electrolyzed in a well-known manner with the use of indissoluble anodes whereby the copper is separated and free sulfuric acid is formed.

The resulting solution containing sulfuric acid and considerable ferric sulfate is then again used for leaching fresh quantities of the roasting product. If this leaching and electrolyzing process is repeated several times, the solution will contain such large quantities of sulfate of sodium and other salts that it will be impossible to again use the solution for leaching purposes. This is the case when the solution has a content of about 450 gr. sulfate of sodium and more per liter. The solution may also contain 80 gr. of nickel or iron respectively and up to 150 gr. of zinc. This solution is now used instead of new quantities of sulfate of sodium as an addition to the ore to be treated in the roasting furnace. The entire quantity of iron salts contained in the solution is then decomposed during the roasting operation but the sulfates of other metals such as zinc and nickel are not decomposed and are therefore returned to the solution at the following leaching. These metals have therefore to be removed from the solution either by electrolysis or by precipitation with soda or lime. The iron and the free acid of the solution added to the initial material is of great influence in making the roasting more complete. The iron is present in the solution as ferric sulfate and has therefore a dissolving effect on the sulfid of copper or the sulfid of zinc or nickel respectively which is still present in the ore on account of the incomplete roasting. The material roasted with sodium sulfate has proved to contain said sulfids in such a mechanical condition that they will be far more completely dissolved by the electrolyte than if roasting without the addition of sodium sulfate.

It is evident that complete removal of the copper before returning the electrolyte to the roasting furnace is not necessary because the remaining copper is not lost. In same cases it will be of advantage to leach with water before leaching with the electrolyte. For the solution thus obtained is free from iron and if it is electrolyzed until free from copper, the remaining metals can be precipitated free from iron and copper. Besides this advantage a reduction of power consumption in the electrolysis of the copper is obtained if the solution is free from iron. It is therefore in some cases of great advantage to leach with water first and with acid afterward.

The small losses of sodium sulfate occurring during the repeated leaching may suitably be compensated by adding sodium chlorid which is then decomposed in the roasting furnace sodium sulfate being thereby formed.

Claims.

1. The process of treating sulfid copper ores, which consists in adding sodium sulfate thereto according to the content of copper in the ores, roasting the ore and sulfate, thereby uniting said sulfate with copper sulfate to form an easily fusible compound for readily dissolving sulfids, leaching the product with dilute sulfuric acid, thereby simultaneously dissolving said added sodium sulfate with the sulfates formed during the roasting, and electrolyzing the solution obtained to separate the copper and form free sulfuric acid.

2. The process of treating sulfid copper ores, which consists in adding sodium sulfate thereto according to the content of copper in the ores, roasting the ore and sulfate, leaching the product with dilute-sulfuric acid thereby simultaneously dissolving said added sodium sulfate with the sulfates formed during the roasting, and electrolyzing the solution obtained to separate the copper and form free sulfuric acid and to convert the ferrous sulfate into ferric sulfate, using the resulting electrolyte containing the ferric sulfate and liberated sulfuric acid for leaching the roasted ore and sulfate of sodium for producing an electrolyte richer in copper and other metals.

3. The process of treating sulfid copper ores, which consists in adding sodium sulfate thereto, roasting the ore and sulfate, leaching the product with dilute sulfuric acid thereby simultaneously dissolving said added sodium sulfate with the sulfates formed during the roasting, and electrolyzing the solution obtained to separate the copper and form free sulfuric acid and to convert the ferrous sulfate into ferric sulfate, repeatedly using the resulting electrolysis until the electrolysis has a high content of sodium sulfate and then using the solution with raw ore, and roasting the same to eliminate increasing quantities of iron in the solution while maintaining the content of other valuable metals.

4. The process of treating sulfid copper ores containing iron which have been roasted with an alkali metal salt, the step which comprises electrolyzing a leaching solution from said ores to remove the copper and convert the ferrous sulfate content into ferric sulfate while maintaining the content of alkali metal sulfate and remixing the electrolyte when it attains a high content of sodium sulfate, with raw ore, and roasting the mixture.

5. The process of treating sulfid ores containing copper and other values and iron, which comprises roasting the ore in the presence of a small percentage of sodium sulfate, thereby uniting said sulfate with the sulfate of copper formed by the roasting to form an easily fusible compound, producing a sulfate solution from the roasted product, removing the copper therefrom while converting the iron from the ferrous to the ferric state and maintaining sodium sulfate in solution, using the resulting solution as a leaching solution when permissible, and returning the solution when its sodium sulfate content has largely increased to the furnace with raw ore for roasting.

In testimony that I claim the foregoing as my invention, I have signed my name in presence of two subscribing witnesses.

NOAK VICTOR HYBINETTE.

Witnesses:
MARTIN GULLORMSUN,
NANA SCHIANDER.